US011113098B2

(12) United States Patent
Liang et al.

(10) Patent No.: US 11,113,098 B2
(45) Date of Patent: Sep. 7, 2021

(54) INTERRUPT PROCESSING METHOD, MASTER CHIP, SLAVE CHIP, AND MULTI-CHIP SYSTEM

(71) Applicant: SHENZHEN GOODIX TECHNOLOGY CO., LTD., Guangdong (CN)

(72) Inventors: Zhibing Liang, Shenzhen (CN); Yifan Li, Shenzhen (CN); Zekai Chen, Shenzhen (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 8 days.

(21) Appl. No.: 16/697,111

(22) Filed: Nov. 26, 2019

(65) Prior Publication Data

US 2020/0097320 A1    Mar. 26, 2020

Related U.S. Application Data

(63) Continuation of application No. PCT/CN2018/102019, filed on Aug. 23, 2018.

(51) Int. Cl.
*G06F 9/30*   (2018.01)
*G06F 13/26*  (2006.01)
(Continued)

(52) U.S. Cl.
CPC ........ *G06F 9/4812* (2013.01); *G06F 9/30043* (2013.01); *G06F 9/30087* (2013.01);
(Continued)

(58) Field of Classification Search
CPC ............................. G06F 9/30043; G06F 13/26
See application file for complete search history.

(56) References Cited

U.S. PATENT DOCUMENTS

| 4,567,606 A | * | 1/1986 | Vensko | ..................... G06F 3/16 |
| | | | | 704/251 |
| 5,133,056 A | * | 7/1992 | Miyamori | ............... G06F 13/26 |
| | | | | 710/264 |

(Continued)

FOREIGN PATENT DOCUMENTS

| CN | 104519359 A | 4/2015 |
| CN | 106708771 A | 7/2017 |

OTHER PUBLICATIONS

Anonymous, "82C59A—CMOS Priority Interrupt Controller," Intersil Data Sheet—FN2784.5, Mar. 17, 2006, 22 pages.

(Continued)

*Primary Examiner* — Zachary K Huson
(74) *Attorney, Agent, or Firm* — Davis Wright Tremaine LLP

(57) ABSTRACT

The present disclosure relates to the field of a multi-chip system, and provides an interrupt processing method, a master chip, a slave chip, and a multi-chip system. An interrupt processing method is applied to a master chip and includes: when an interrupt transport request sent by a slave chip through an interrupt line is detected, obtaining all current interrupt requests (irq_s_1-irq_s_N) of the slave chip, the interrupt request (irq_s_1_-irq_s_N) is generated by a first peripheral (4) of the slave chip; obtaining an interrupt subroutine corresponding to each of the interrupt requests (irq_s_1-irq_s_N), and processing the corresponding interrupt request (irq_s_1-irq_s_N) by using the interrupt subroutine. In the embodiments of the present disclosure, all the interrupt requests (irq_s_1-irq_s_N) of the slave chip are mapped to the master chip, so that the interrupt processing flow of the peripheral on the slave chip is simplified.

20 Claims, 10 Drawing Sheets

(51) Int. Cl.
    *G06F 9/48*     (2006.01)
    *G06F 9/38*     (2018.01)

(52) U.S. Cl.
    CPC ........ *G06F 9/30101* (2013.01); *G06F 9/3865* (2013.01); *G06F 13/26* (2013.01)

(56) References Cited

U.S. PATENT DOCUMENTS

2003/0093594 A1    5/2003   Smith et al.
2014/0317322 A1*  10/2014  Rohatschek .......... H04L 12/423
                                                                       710/110

OTHER PUBLICATIONS

Extended European Search Report dated Oct. 22, 2020, Patent Application No. 18919394.9, 13 pages.
International Search Report mailed in International Patent Application No. PCT/CN2018/102019, filed on Aug. 23, 2018, 5 pages.

* cited by examiner

INTERRUPT PROCESSING METHOD, MASTER CHIP, SLAVE CHIP, AND MULTI-CHIP SYSTEM

CROSS-REFERENCE TO RELATED APPLICATIONS

The present application is a continuation of international application No. PCT/CN2018/102019, filed on Aug. 23, 2018, the content of which is hereby incorporated by reference in its entirety.

TECHNICAL FIELD

The present disclosure relates to the field of a multi-chip system, and in particular, to an interrupt processing method, a master chip, a slave chip, and a multi-chip system.

BACKGROUND

In an existing dual-chip or multi-chip system, each peripheral generating an interrupt on a master chip corresponds to an interrupt entry and an interrupt subroutine. When a certain peripheral generates an interrupt request, the master chip processes the interrupt request through the interrupt subroutine corresponding to the peripheral. Each slave chip and the master chip are usually connected through an interrupt line. All peripherals that generate interrupts on the slave chip need to share this interrupt line, and share one interrupt entry and one interrupt subroutine on the master chip. For interrupts generated by different peripherals on the slave chip, the master chip needs to perform distinguishing and processing by querying an interrupt flag in the shared interrupt subroutine. When a plurality of peripherals exist in a slave chip that generate interrupt requests, the interrupt processing method has the following problems: (1) when there are more peripherals on the slave chip, an interrupt processing flow of the shared interrupt subroutine is also very complicated; (2) an interrupt processing flow of the peripheral of the slave chip is inconsistent with an interrupt processing flow of the peripheral of the master chip. Assuming that the same peripheral exists in both the slave chip and the master chip, the peripheral is respectively denoted as per_s and per_m. For per_s, a microcontroller unit (MCU) of the master chip processes an interrupt of per_s on a branch of an interrupt subroutine (irq_sery_s) corresponding to the slave chip. However, for per_m, a MCU of the master chip processes an interrupt of per_m in an interrupt subroutine (irq_serv_per_m) corresponding to per_m. Apparently, for per_s and per_m, the processing flow of the interrupt subroutine is inconsistent, and there are significant differences in use. From the point of view of a system and user use, this difference is easy to cause confusion for users and cause inconvenience for users.

SUMMARY

Some embodiments of the present disclosure are intended to provide an interrupt processing method, a master chip, a slave chip, and a multi-chip system, so that an interrupt processing flow of a peripheral of the slave chip is consistent with that of a peripheral of the master chip, and is convenient for the user to use. In addition, the interrupt processing process of the peripheral on the slave chip is simplified.

An embodiment of the present disclosure provides an interrupt processing method applied to a master chip and including: when an interrupt transport request sent by a slave chip through an interrupt line is detected, obtaining all current interrupt requests of the slave chip, the interrupt request being sent by a first peripheral of the slave chip; obtaining an interrupt subroutine corresponding to each of the interrupt requests, and processing the corresponding interrupt request by using the interrupt subroutine.

An embodiment of the present disclosure further provides an interrupt processing method applied to a slave chip, including: outputting an interrupt transport request to an interrupt line between the slave chip and a master chip when a first peripheral of the slave chip generates an interrupt request, and aggregating all current interrupt requests of the slave chip for the master chip to obtain all the interrupt requests simultaneously.

An embodiment of the present disclosure further provides a slave chip, including an interrupt pin output module and at least one first peripheral for generating an interrupt request; the first peripheral being connected to the interrupt pin output module; the first peripheral being configured to trigger, when generating the interrupt request, the interrupt pin output module to output an interrupt transport request to an interrupt line between the slave chip and a master chip, and all current interrupt requests of the slave chip being aggregated for the master chip to obtain all the interrupt requests simultaneously.

An embodiment of the present disclosure further provides a master chip, including an interrupt controller, a MCU, and an interrupt detection module; the interrupt controller being respectively connected to the MCU and the interrupt detection module; and the interrupt detection module being configured to send, when it is detected that there is an interrupt transport request sent by a slave chip on an interrupt line, the interrupt transport request to the interrupt controller; the interrupt controller being configured to send an interrupt request acquisition notification to the MCU when receiving the interrupt transport request; the MCU being configured to obtain, when receiving the interrupt request acquisition notification, all current interrupt requests of the slave chip, obtain an interrupt subroutine corresponding to each of the interrupt requests, and process the corresponding interrupt request by using the interrupt subroutine, the interrupt request being generated by a first peripheral of the slave chip.

An embodiment of the present disclosure further provides a multi-chip system, including the foregoing master chip and at least one slave chip as above-described; an interrupt line being connected between each of the slave chips and the master chip; a first communication interface being disposed on each of the slave chips, at least one second communication interface being disposed on the master chip, and each of the first communication interfaces being correspondingly connected to one of the second communication interfaces.

In comparison to the existing technologies, in the embodiments of the present disclosure, the master chip directly obtains all the current interrupt requests of the slave chip by accessing the slave chip when an interrupt request of the slave chip is detected, that is, all the interrupt requests of the slave chip are mapped to the master chip. Like an interrupt request generated by a peripheral of the master chip, each interrupt request mapped to the master chip has a corresponding interrupt subroutine on the master chip, and the master chip may process each interrupt request mapped to the master chip by using the corresponding interrupt subroutine. From the perspective of a system and a user, there is no difference between the interrupt request mapped to the master chip and the interrupt request generated by the peripheral of the master chip, and the interrupt processing flow of the two interrupt requests is also consistent, thereby facilitating the user's use. In addition, according to the embodiments of the present disclosure, the interrupt requests generated by all peripherals on the slave chip are prevented from being processed by using one interrupt subroutine, and the interrupt processing flow of the peripheral on the slave chip is also simplified.

Moreover, the obtaining all current interrupt requests of the slave chip includes: reading a current value of a first interrupt register of the slave chip, and writing the value to a second interrupt register of the master chip, to obtain all the current interrupt requests of the slave chip; where the first interrupt register stores all the current interrupt requests of the slave chip. All interrupt requests are first aggregated in the first interrupt register, so that the master chip can read all the interrupt requests once.

Furthermore, the obtaining all current interrupt requests of the slave chip includes: obtaining all the current interrupt requests of the slave chip through a transport subroutine corresponding to the slave chip. With the transport subroutine, pressure of a main program may be shared, and it is beneficial to respond to the interrupt request in a timely manner.

Moreover, after the corresponding interrupt request is processed by using the interrupt subroutine, or any of the interrupt requests is processed, the method further includes: clearing an interrupt flag that is of the first peripheral and that corresponds to the processed interrupt request, the value of the first interrupt register being synchronously adjusted with the clearing of the interrupt flag of the first peripheral. The interrupt flag that is of the first peripheral and that corresponds to the processed interrupt request is cleared in time, which is beneficial to avoid repeated processing.

In addition, after the interrupt flag that is of the first peripheral and that corresponds to the processed interrupt request is cleared, the method further includes: clearing an interrupt request corresponding to the interrupt flag in the second interrupt register. This helps release storage space of the second interrupt register in time.

Besides, after interrupt flags that are of the first peripheral and that correspond to all the current interrupt requests of the slave chip are cleared, the method further includes: eliminating the interrupt transport request. The corresponding interrupt transport request is eliminated in time, which helps avoid repetitive work.

In addition, the processing the corresponding interrupt request by using the interrupt subroutine includes: performing sorting in order of priority on the interrupt request of the slave chip, an interrupt request generated by a second peripheral of the master chip, and the interrupt transport request; processing, by using the corresponding interrupt subroutine in descending order of the priority, the interrupt request of the slave chip, the interrupt request generated by the second peripheral of the master chip, and the interrupt transport request, where a priority level of the interrupt transport request is lower than that of the interrupt request of the slave chip. The priority level of the interrupt transport request is lower than that of the interrupt request of the slave chip, which is beneficial to ensure that the interrupt request of the slave chip is processed in time.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

To make the objectives, the technical solutions, and the advantages of the present disclosure clearer, the following further describes some embodiments of the present disclosure in detail with reference to the accompanying drawings and the embodiments. It should be understood that the specific embodiments described herein are merely used to illustrate the present disclosure, and are not intend to limit the present disclosure.

Figure 1:
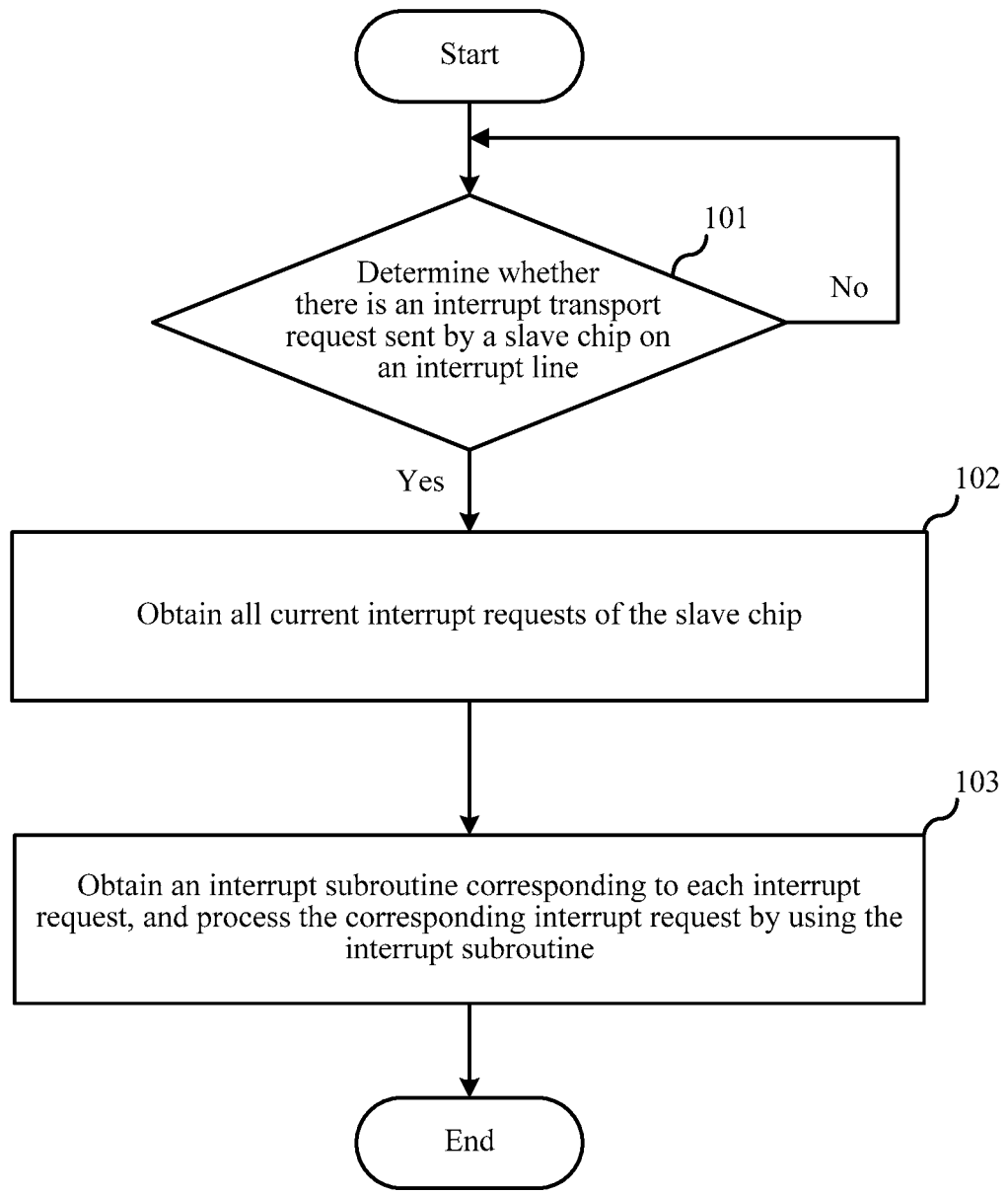
FIG. 1 is a specific flowchart of an interrupt processing method according to a first embodiment of the present disclosure.

A first embodiment of the present disclosure relates to an interrupt processing method applied to a master chip. The master chip may be a master chip of a multi-chip system, the multi-chip system may include one master chip and at least one slave chip, and an interrupt line is connected between each slave chip and the master chip. A specific process of this embodiment is shown in FIG. 1.

Step 101: It is determined whether there is an interrupt transport request sent by a slave chip on an interrupt line. If so, proceed to step 102; if not, return to this step (that is, continue to query whether there is an interrupt transport request sent by the slave chip).

In this embodiment, each slave chip may include at least one first peripheral for generating an interrupt request, and any of the first peripherals may trigger an interrupt pin output module on the slave chip to output the interrupt transport request to an interrupt line between the slave chip and a master chip when the interrupt request is generated. It is worth mentioning that when the slave chip includes a plurality of (such as two or more) first peripherals and at least two first peripherals simultaneously generate an interrupt request, the interrupt pin output module only needs to output the interrupt transport request to the interrupt line once. In addition, it should be noted that, in actual application, the interrupt pin output module may directly output the interrupt request generated by the first peripheral as an interrupt transport request to the interrupt line, to remind the master chip that an interrupt request is generated on the slave chip currently. It should be noted that the first peripheral herein refers to various possible different peripherals on the slave chip, and does not represent a single peripheral.

Step 102: All current interrupt requests of the slave chip are obtained.

When it is determined that there is an interrupt transport request on the interrupt line, the master chip may obtain all the current interrupt requests of the slave chip corresponding to the interrupt line. Specifically, in one example, each slave chip may include a first communication interface, the master chip may include a plurality of second communication interfaces (a quantity of the second communication interfaces may be the same as a quantity of slave chips), and each second communication interface is connected to one first communication interface. In this step, the second communication interface corresponding to the slave chip on the master chip may obtain all the current interrupt requests of the slave chip by accessing the first communication interface of the slave chip.

Step 103: An interrupt subroutine corresponding to each interrupt request is obtained, and a corresponding interrupt request is processed by using the interrupt subroutine.

The master chip directly obtains all the current interrupt requests of a slave chip by accessing the slave chip, that is, all the interrupt requests of the slave chip are mapped to the master chip. Like an interrupt request generated by each second peripheral (a peripheral that may generate the interrupt request and that is on the master chip) on the master chip, each interrupt request mapped to the master chip corresponds to one interrupt subroutine. Therefore, in this step, the master chip may obtain an interrupt subroutine corresponding to each interrupt request of the first peripheral on the slave chip, and process the corresponding interrupt request through each of the obtained interrupt subroutines.

In comparison to the existing technologies, in the embodiment, the master chip directly obtains all the current interrupt requests of a slave chip by accessing the slave chip when an interrupt request of the slave chip is detected, that is, all the interrupt requests of the slave chip are mapped to the master chip. Like an interrupt request generated by a peripheral of the master chip, each interrupt request mapped to the master chip has a corresponding interrupt subroutine on the master chip, and the master chip may process each interrupt request mapped to the master chip by using the corresponding interrupt subroutine. From the perspective of a system and a user, there is no difference between the interrupt request mapped to the master chip and the interrupt request generated by the peripheral of the master chip, and the interrupt processing flow of the two interrupt requests is also consistent, thereby facilitating the user's use. In addition, according to the embodiment of the present disclosure, the interrupt requests generated by all peripherals on the slave chip are prevented from being processed by using one interrupt subroutine, and the interrupt processing flow of the peripheral on the slave chip is also simplified.

Figure 2:
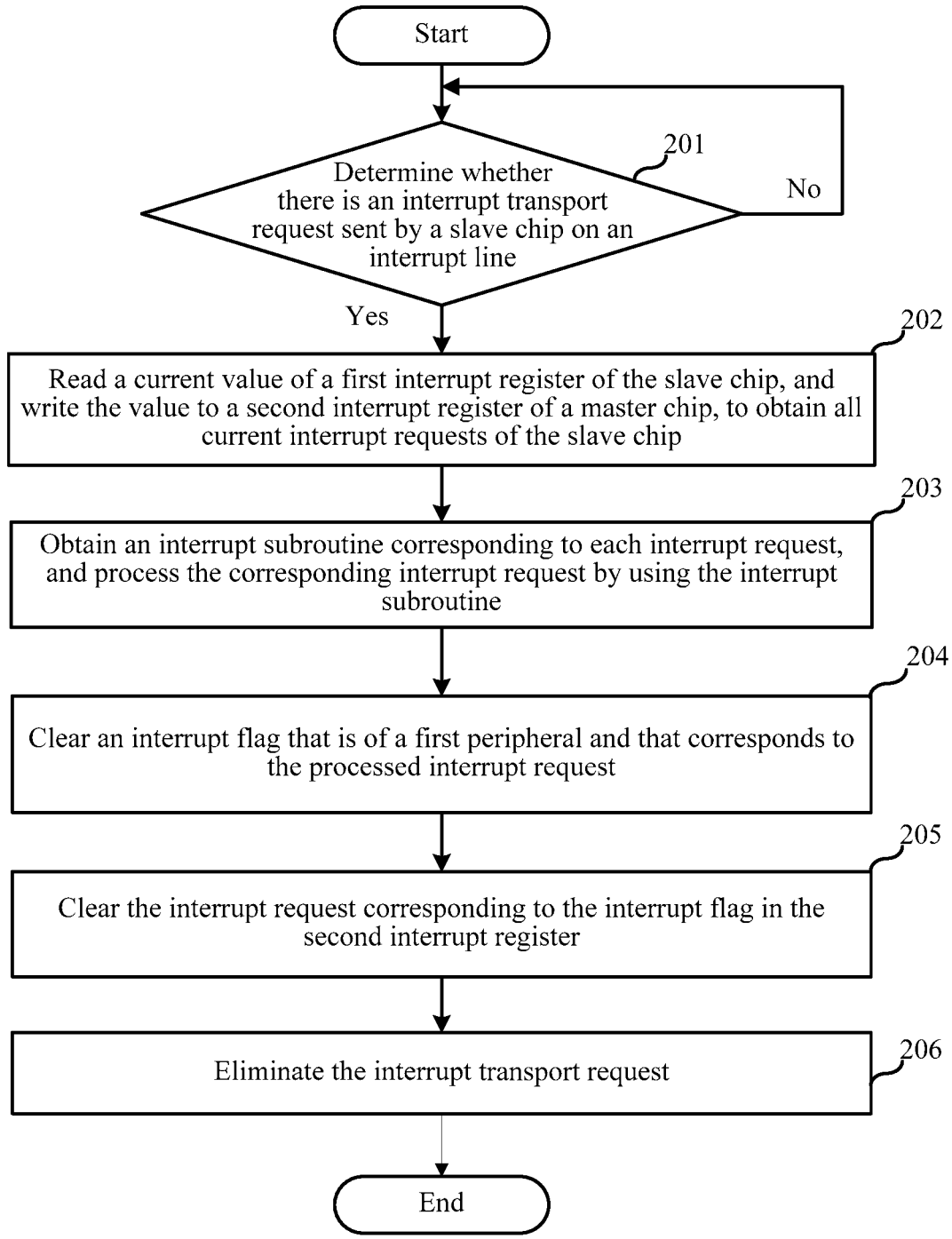
FIG. 2 is a specific flowchart of an interrupt processing method according to a second embodiment of the present disclosure.

A second embodiment of the present disclosure relates to an interrupt processing method. This embodiment is refined based on the first embodiment. The main refinement is that this embodiment provides a specific method for simultaneously obtaining all the current interrupt requests of the slave chip. A specific process of this embodiment is shown in FIG. 2.

Step 201: It is determined whether there is an interrupt transport request sent by a slave chip on an interrupt line. If so, proceed to step 202; if not, return to this step (that is, continue to query whether there is an interrupt transport request sent by the slave chip).

Step 202: A current value of a first interrupt register of the slave chip is read, and written into a second interrupt register of a master chip, to obtain all current interrupt requests of the slave chip.

Specifically, in this embodiment, the slave chip includes a first interrupt register, and all first peripherals on the slave chip are connected to the first interrupt register. When the first peripheral on the slave chip generates an interrupt request, on the one hand, an interrupt pin output module on the slave chip is triggered to output an interrupt transport request to an interrupt line, and on the other hand, the generated interrupt request is stored into the first interrupt register. In other words, the first interrupt register stores all the current interrupt requests of the slave chip, and a value of the first interrupt register represents all the current interrupt requests of the slave chip. The master chip may first determine the slave chip corresponding to the interrupt line when it is detected that there is an interrupt transport request on the interrupt line. In actual application, a correspondence between each slave chip and the interrupt line connected to the slave chip may be established in advance, and the correspondence is stored into the master chip. When it is detected that there is an interrupt transport request on a certain interrupt line, the master chip may first search for a slave chip corresponding to the interrupt line from the preset correspondence, and the found slave chip is used as the slave chip corresponding to the interrupt line. Then, the master chip may access the slave chip through a corresponding communication interface, to read a current value of a first interrupt register of the slave chip, and write the value into a second interrupt register of the master chip, thereby mapping all the current interrupt requests of the slave chip to the master chip. The first interrupt register is disposed in the slave chip, and all the current interrupt requests are aggregated in the first interrupt register, so that the master chip can read all the interrupt requests of the first peripheral connected to the slave chip once.

Preferably, in this embodiment, the master chip may search for a transport subroutine corresponding to the slave chip (the transport subroutine is a program in the master chip), and read all the current interrupt requests of the slave chip by using the transport subroutine, to obtain all the current interrupt requests of the slave chip. The interrupt request of the slave chip is obtained by using the transport subroutine, pressure of a main program may be shared, and it is beneficial to rapidly respond to the interrupt request of the slave chip.

Step 203: An interrupt subroutine corresponding to each interrupt request is obtained, and a corresponding interrupt request is processed by using the interrupt subroutine.

In actual application, the master chip not only needs to process the interrupt request of the slave chip, but a second peripheral on the master chip also generates an interrupt request. In one example, the master chip may process the interrupt request of the slave chip and the interrupt request of the master chip in the following manner: first performing sorting in order of priority on the interrupt request of the slave chip, the interrupt request generated by the second peripheral on the master chip, and the previously detected interrupt transport request; then processing, by using a corresponding interrupt subroutine in descending order of the priority, the interrupt request of the slave chip, the interrupt request generated by the second peripheral of the master chip, and the interrupt transport request. The priority of the interrupt request generated by the second peripheral of the master chip may be set according to actual needs, which is not limited in this embodiment.

It should be noted that a priority level of the interrupt transport request should be lower than that of the interrupt request of the slave chip. In other words, it is necessary to process all the current interrupt requests of the slave chip before the previously detected (that is, detected in step 201) interrupt transport request is processed. This is because the interrupt transport request is usually a level signal (such as a high level). If the interrupt transport request is eliminated first, the first peripheral that generates the interrupt request still triggers the interrupt pin output module to send an interrupt transport request. In this way, the master chip continually responds to the interrupt transport request, and the interrupt request that is of the slave chip and that is mapped to the master chip cannot be processed. Therefore, when an interrupt transport request is detected, the interrupt request of the slave chip is processed first, and then the interrupt transport request is processed (that is, eliminated).

Step 204: An interrupt flag that is of a first peripheral and that corresponds to the processed interrupt request is cleared.

Figure 3A:
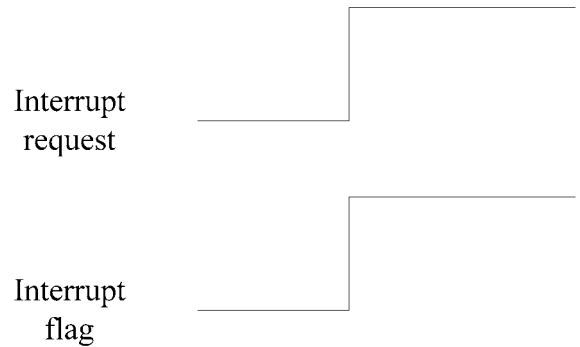
FIGS. 3A and 3B are schematic diagrams of an interrupt request and an interrupt flag according to the second embodiment of the present disclosure.
Figure 3B:
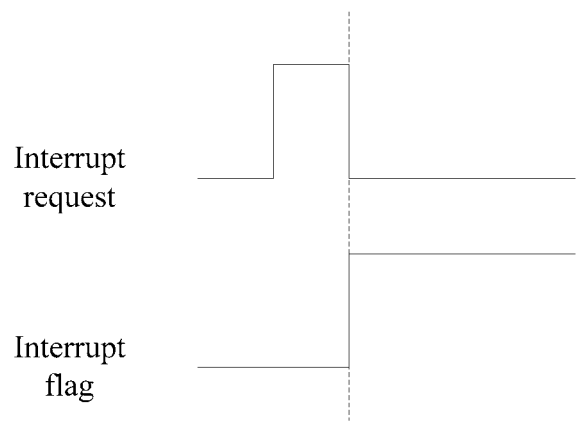

The interrupt flag is a level signal. When the interrupt request is a level signal, the interrupt flag and the interrupt request are a same signal (as shown in FIG. 3A). In this case, the interrupt flag is cleared, and the interrupt request is also cleared. In particular, when the interrupt request is a pulse signal (as in FIG. 3B), because the interrupt request exists only in a current period of the pulse signal, it is only necessary to clear the interrupt flag. It should be noted that FIGS. 3A and 3B are only examples, and specific signal forms of the interrupt request and the interrupt flag are not limited thereto.

After the interrupt request that is of the slave chip and that is mapped to the master chip is processed, the master chip may access the slave chip through the corresponding communication interface, and clear the interrupt flag that is of the first peripheral and that corresponds to the processed interrupt request. When the interrupt flag that is of the first peripheral and that corresponds to the processed interrupt request is cleared, a clearing subroutine that corresponds to the first peripheral and that corresponds to the processed interrupt request may be first obtained, and the corresponding interrupt flag of the first peripheral is cleared through the clearing subroutine.

It should be noted that, in this embodiment, that the interrupt flag that is of the first peripheral and that corresponds to the processed interrupt request is cleared after all the current interrupt requests of the slave chip are processed is used as an example for description. However, this is not limited thereto. In actual application, after any interrupt request of the slave chip is processed, the interrupt flag that is of the first peripheral and that corresponds to the processed interrupt request may be cleared.

It should be noted that, in this embodiment, a first interrupt register in the slave chip is preferably a readable register. A signal stored in the readable register and the interrupt flag of the first peripheral are a same signal. When the interrupt flag of the first peripheral is cleared, the corresponding signal in the readable register is automatically cleared, and a value of the first interrupt register is also adjusted synchronously.

Step 205: An interrupt request corresponding to the interrupt flag in a second interrupt register is cleared.

After the master chip clears the interrupt flag that is of the first peripheral and that corresponds to a certain processed interrupt request, the processed interrupt request may be cleared from the second interrupt register, to release space of the second interrupt register in time and avoid repeated processing.

Step 206: The interrupt transport request is eliminated.

It should be noted that, in this embodiment, that step 205 is performed first, and then step 206 is performed is used as an example. However, this is not limited thereto. In actual application, this step may alternatively be performed after an interrupt flag that is of the first peripheral and that corresponds to the current interrupt request of the slave chip are eliminated. As described above, if the interrupt transport request is eliminated before the interrupt request is processed without first clearing the interrupt flag, the interrupt transport request continues to exist on the corresponding interrupt line. In this way, the master chip always responds to the interrupt transport request, the interrupt request mapped to the master chip cannot be processed, and the corresponding interrupt flag of the first peripheral on the slave chip is never eliminated. Therefore, the interrupt request needs to be first processed, then the interrupt flag is eliminated, and finally the interrupt transport request is eliminated.

The second embodiment provides a specific method for simultaneously obtaining all current interrupt requests of a slave chip, that is, aggregating all current interrupt requests of a slave chip into a readable register (a first interrupt register), so that a master chip may simultaneously read all the current interrupt requests of the slave chip from the readable register.

Figure 4:
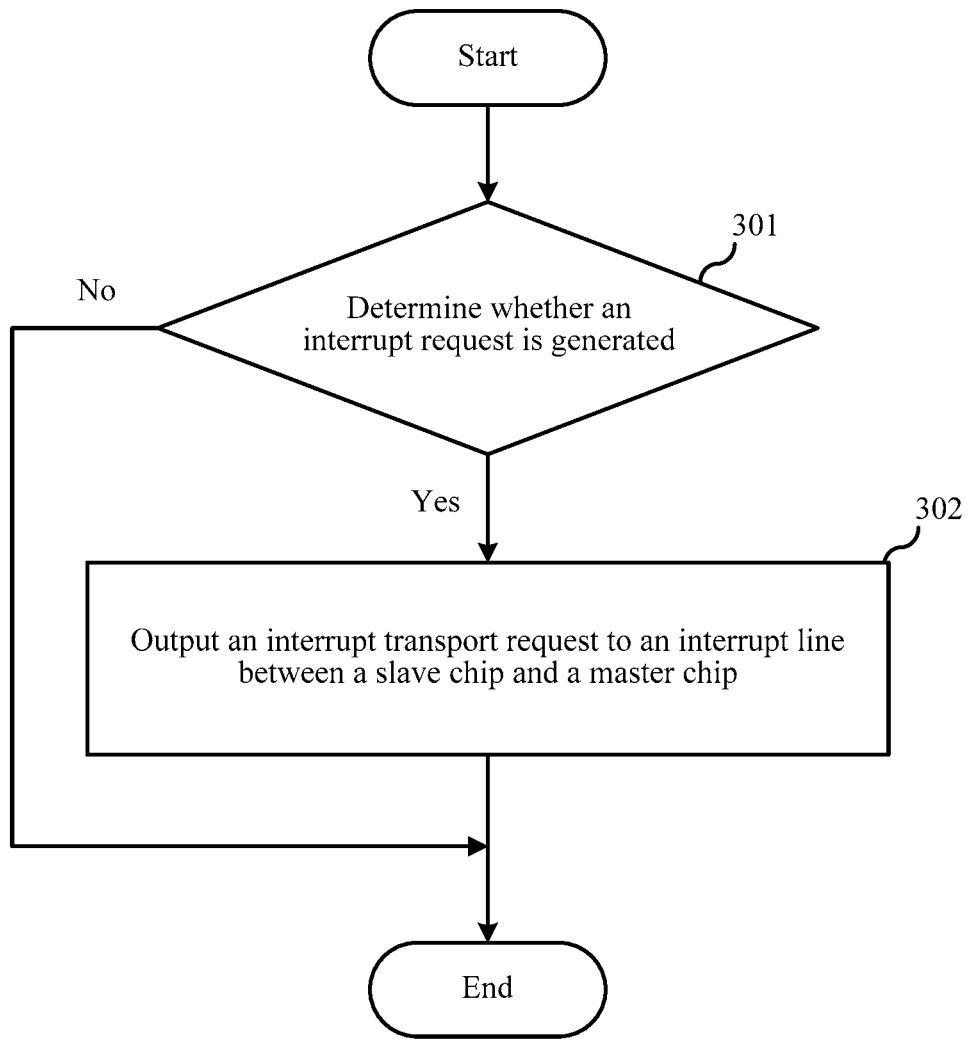
FIG. 4 is a specific flowchart of an interrupt processing method according to a third embodiment of the present disclosure.

A third embodiment of the present disclosure relates to an interrupt processing method applied to a slave chip. The slave chip may be a slave chip of a multi-chip system. The multi-chip system may include one master chip and at least one slave chip, and one interrupt line is connected between the master chip and each slave chip. This embodiment may be implemented in cooperation with the first embodiment (that is, a process from a perspective of a master chip in the first embodiment and a process from a perspective of a slave chip in the third embodiment are cooperated to complete an entire interrupt processing routine). A specific process of this embodiment is shown in FIG. 4.

Step 301: It is determined whether an interrupt request is generated. If so, proceed to step 302. If not, the process comes to an end.

Step 302: An interrupt transport request is output to an interrupt line between the slave chip and a master chip.

When an interrupt request is generated by a first peripheral, the slave chip outputs the interrupt request to the interrupt line to remind the master chip. In addition, in this embodiment, the slave chip further aggregates all current interrupt requests to be simultaneously obtained by the master chip.

In comparison to the existing technologies, in this embodiment, when an interrupt request is detected, an interrupt transport request is output to the interrupt line between the slave chip and the master chip, to remind the master chip to map an interrupt request currently generated by the slave chip to the master chip. Like an interrupt request generated by a peripheral of the master chip, each interrupt request mapped to the master chip has a corresponding interrupt subroutine on the master chip, and the master chip may process each interrupt request mapped to the master chip by using the corresponding interrupt subroutine. From the perspective of a system and a user, there is no difference between the interrupt request mapped to the master chip and the interrupt request generated by the peripheral of the master chip, and the interrupt processing flow of the two interrupt requests is also consistent, thereby facilitating the user's use. In addition, according to the embodiments of the present disclosure, the interrupt requests generated by all peripherals on the slave chip are prevented from being processed by using one interrupt subroutine, and the interrupt processing flow of the peripheral on the slave chip is also simplified.

Figure 5:
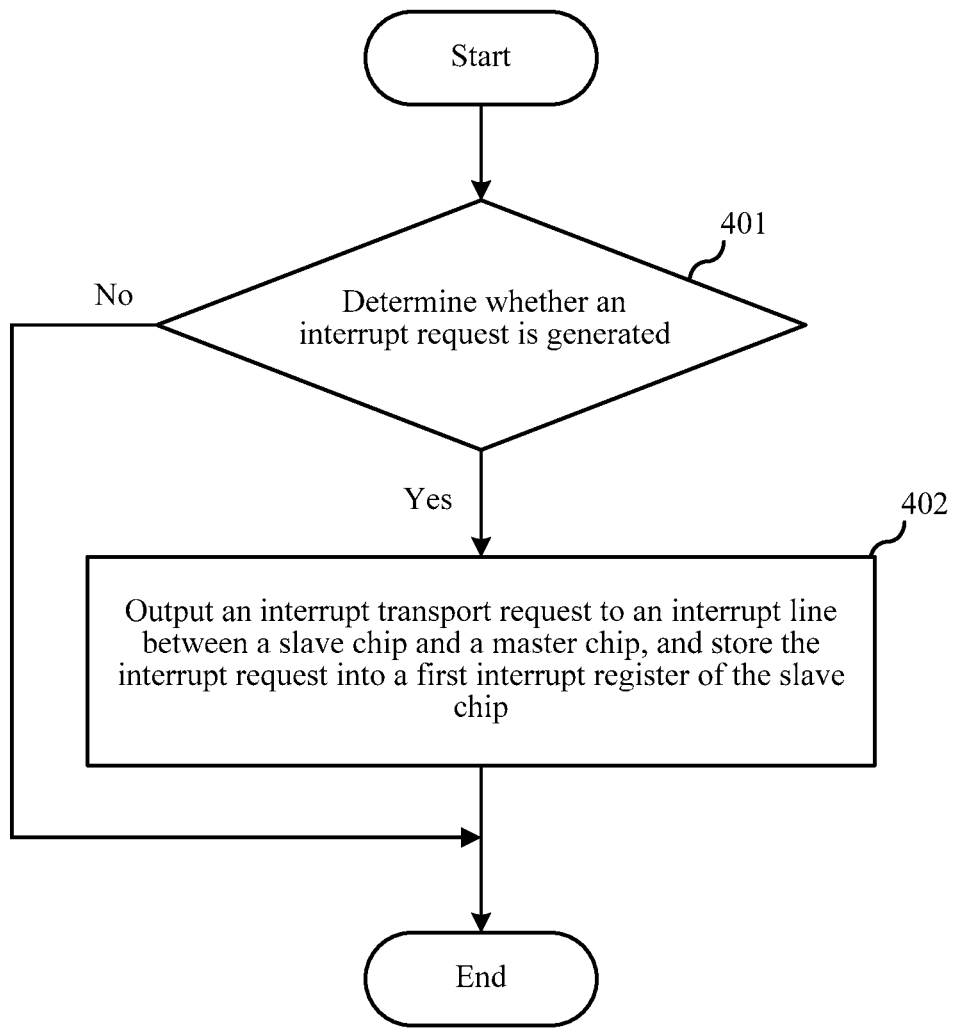
FIG. 5 is a specific flowchart of an interrupt processing method according to a fourth embodiment of the present disclosure.

A fourth embodiment relates to an interrupt processing method. This embodiment is refined based on the third embodiment, and the main refinement is that: this embodiment provides a specific method for simultaneously obtaining all current interrupt requests of a slave chip. This embodiment may be implemented in cooperation with the second embodiment. A specific process of this embodiment is shown in FIG. 5.

Step 401: It is determined whether an interrupt request is generated. If so, proceed to step 402. If not, the process comes to an end.

Step 402: An interrupt transport request is output to an interrupt line between the slave chip and a master chip, and the interrupt request is stored into a first interrupt register of the slave chip.

All first peripherals on the slave chip are connected to the first interrupt register. When the first peripheral on the slave chip generates the interrupt request, on the one hand, an interrupt pin output module on the slave chip is triggered to output the interrupt transport request, on the other hand, the generated interrupt request is stored into the first interrupt register. That is, the first interrupt register stores all the current interrupt requests of the slave chip. In this way, the master chip may obtain all the current interrupt requests of the slave chip by merely reading a current value of the first interrupt register.

The fourth embodiment provides a specific method for simultaneously obtaining all current interrupt requests of a slave chip. That is, all the current interrupt requests of the slave chip are aggregated in a readable register (a first interrupt register), and the master chip may simultaneously read all the current interrupt requests of the slave chip from the readable register.

Figure 6:
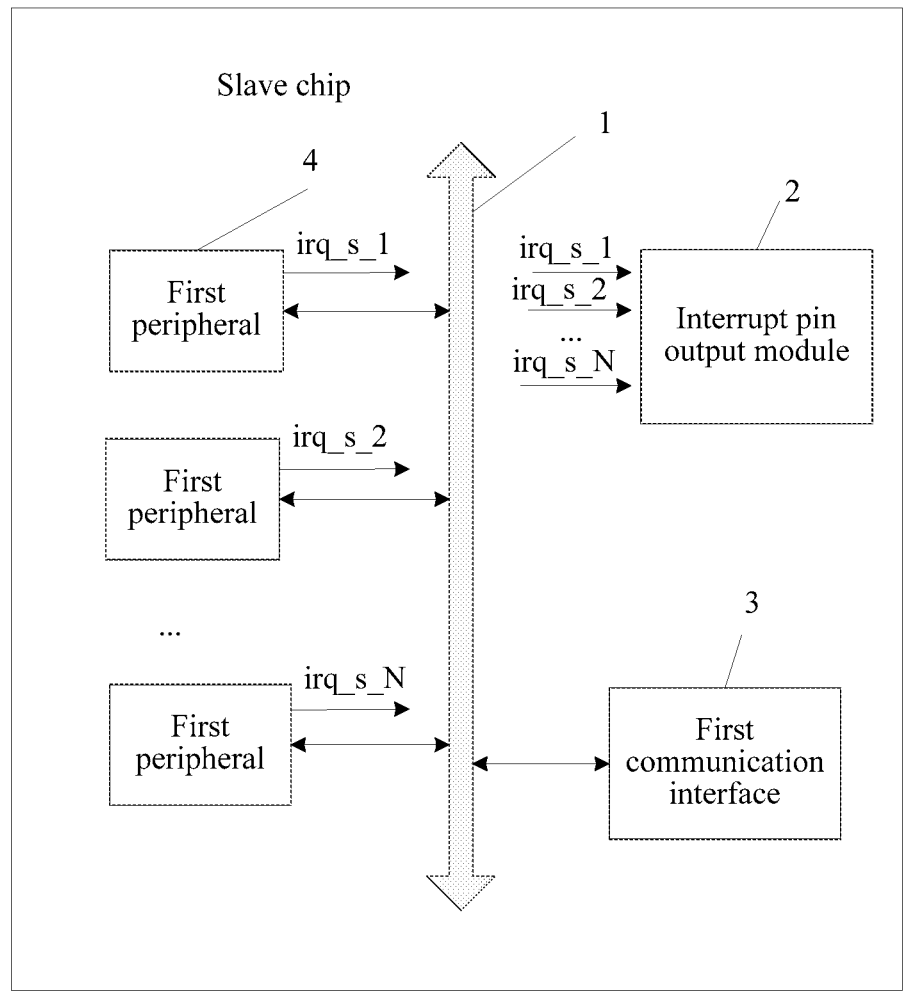
FIG. 6 is a schematic structural diagram of a slave chip according to a fifth embodiment of the present disclosure.

A fifth embodiment of the present disclosure relates to a slave chip. As shown in FIG. 6, the slave chip includes a first bus 1, an interrupt pin output module 2, a first communication interface 3, and at least one first peripheral 4 that may generate an interrupt request. The first bus 1 is separately connected to the first communication interface 3 and each first peripheral 4. Each first peripheral 4 is further connected to the interrupt pin output module 2.

The first peripheral 4 is configured to trigger, when an interrupt request is generated, the interrupt pin output module 2 to output an interrupt transport request to an interrupt line between the slave chip and the master chip. And all the interrupt requests of the slave chip are aggregated for the master chip to simultaneously obtain all interrupt requests.

In actual application, the interrupt request generated by the first peripheral 4 may be directly outputted as the interrupt transport request to the interrupt line. It is worth mentioning that when the slave chip includes two or more first peripherals 4, and at least two first peripherals 4 simultaneously generate the interrupt requests, the interrupt pin output module 2 only needs to output the interrupt transport request to the interrupt line once.

The master chip may access the slave chip through the first communication interface 3 when the interrupt transport request on the interrupt line is detected, and obtain all the current interrupt requests of the slave chip through the first bus 1.

Because the third embodiment and this embodiment correspond to each other, this embodiment may be implemented in cooperation with the third embodiment. Related technical details mentioned in the third embodiment are still valid in this embodiment, and technical effects that can be achieved in the third embodiment may also be achieved in this embodiment. In order to reduce repetition, details are not described herein again. Correspondingly, related technical details mentioned in this embodiment may also be applied to the third embodiment.

In comparison to the existing technologies, in this embodiment, when an interrupt request is detected, an interrupt transport request is output to the interrupt line between the slave chip and the master chip, to remind the master chip to map the interrupt request currently generated by the slave chip to the master chip. Like an interrupt request generated by a peripheral of the master chip, each interrupt request mapped to the master chip has a corresponding interrupt subroutine on the master chip, and the master chip may process each interrupt request mapped to the master chip by using the corresponding interrupt subroutine. From the perspective of a system and a user, there is no difference between the interrupt request mapped to the master chip and the interrupt request generated by the peripheral of the master chip, and the interrupt processing flow of the two interrupt requests is also consistent, thereby facilitating the user's use. In addition, according to the embodiments of the present disclosure, the interrupt requests generated by all peripherals on the slave chip are prevented from being processed by using one interrupt subroutine, and the interrupt processing flow of the peripheral on the slave chip is also simplified.

A sixth embodiment of the present disclosure relates to a slave chip. This embodiment is refined based on the fifth embodiment. The main refinement is that: this embodiment provides a specific method for simultaneously obtaining all current interrupt requests of a slave chip.

Figure 7:
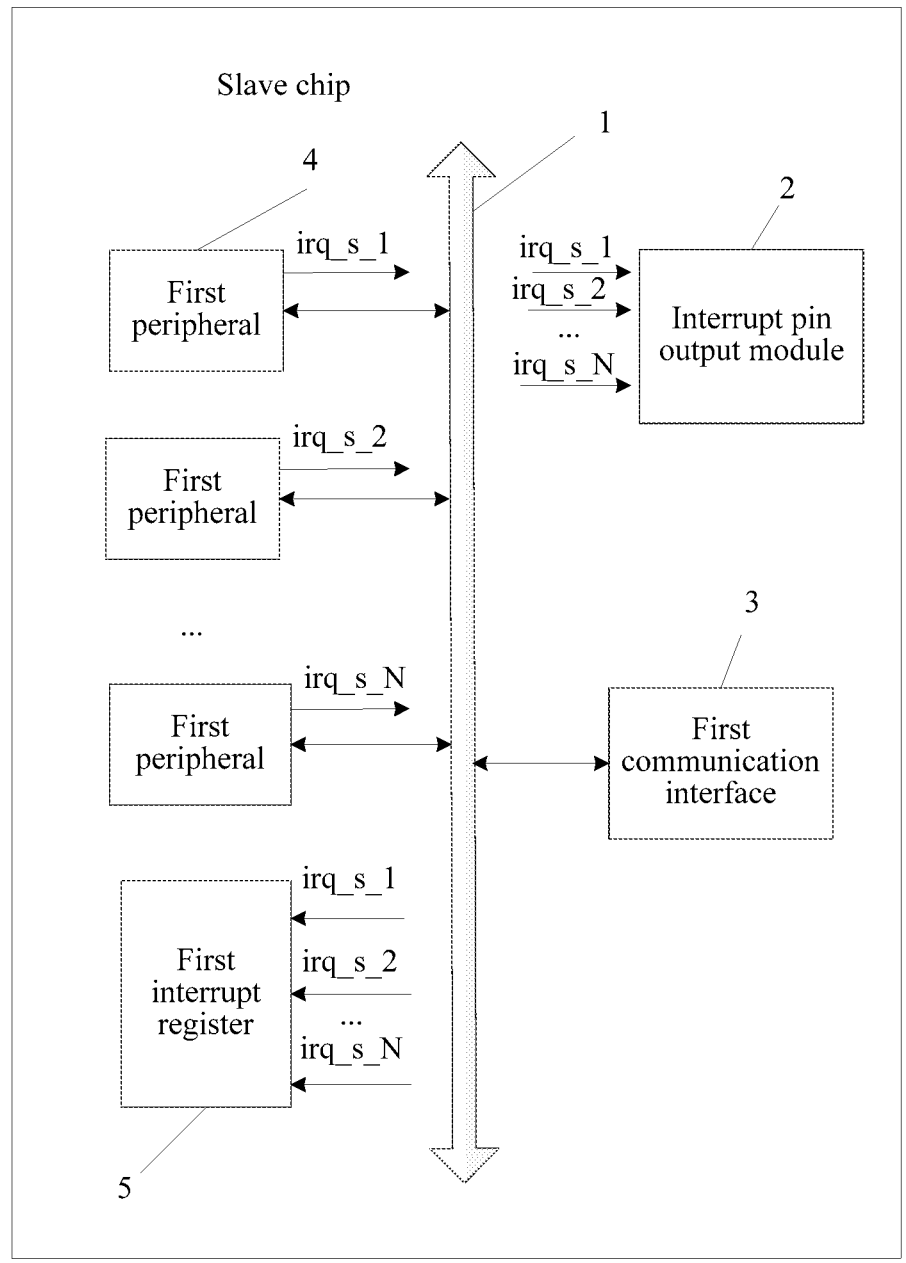
FIG. 7 is a schematic structural diagram of a slave chip according to a sixth embodiment of the present disclosure.

As shown in FIG. 7, the slave chip further includes a first interrupt register 5 and the first peripheral 4 is connected to the first interrupt register 5.

In this embodiment, when an interrupt request is generated, the first peripheral 4 triggers an interrupt pin output module 2 to output an interrupt transport request to an interrupt line between the slave chip and a master chip. In addition, the first peripheral 4 further stores the interrupt request into the first interrupt register 5. In this way, the first interrupt register 4 stores all the current interrupt requests of the slave chip.

The master chip may access the slave chip through the first communication interface 3 when an interrupt transport request on the interrupt line is detected, and access the first interrupt register 5 through the first bus 1. The master chip may obtain all the current interrupt requests of the slave chip through reading a current value of the first interrupt register 5. Preferably, the master chip may read all the current interrupt requests of the slave chip through a transport subroutine corresponding to the slave chip, to obtain all the current interrupt requests of the slave chip. The interrupt request of the slave chip is obtained by using the transport subroutine, pressure of a main program may be shared, and it is beneficial to rapidly respond to the interrupt request of the slave chip.

Because the fourth embodiment and this embodiment correspond to each other, this embodiment may be implemented in cooperation with the fourth embodiment. Related technical details mentioned in the fourth embodiment are still valid in this embodiment, and technical effects that can be achieved in the fourth embodiment may also be achieved in this embodiment. In order to reduce repetition, details are not described herein again. Correspondingly, related technical details mentioned in this embodiment may also be applied to the fourth embodiment.

The sixth embodiment provides a specific method for simultaneously obtaining all current interrupt requests of a slave chip. That is, all the current interrupt requests of the slave chip are aggregated in a readable register (a first interrupt register), and the master chip may simultaneously read all the current interrupt requests of the slave chip from the readable register.

Figure 8:
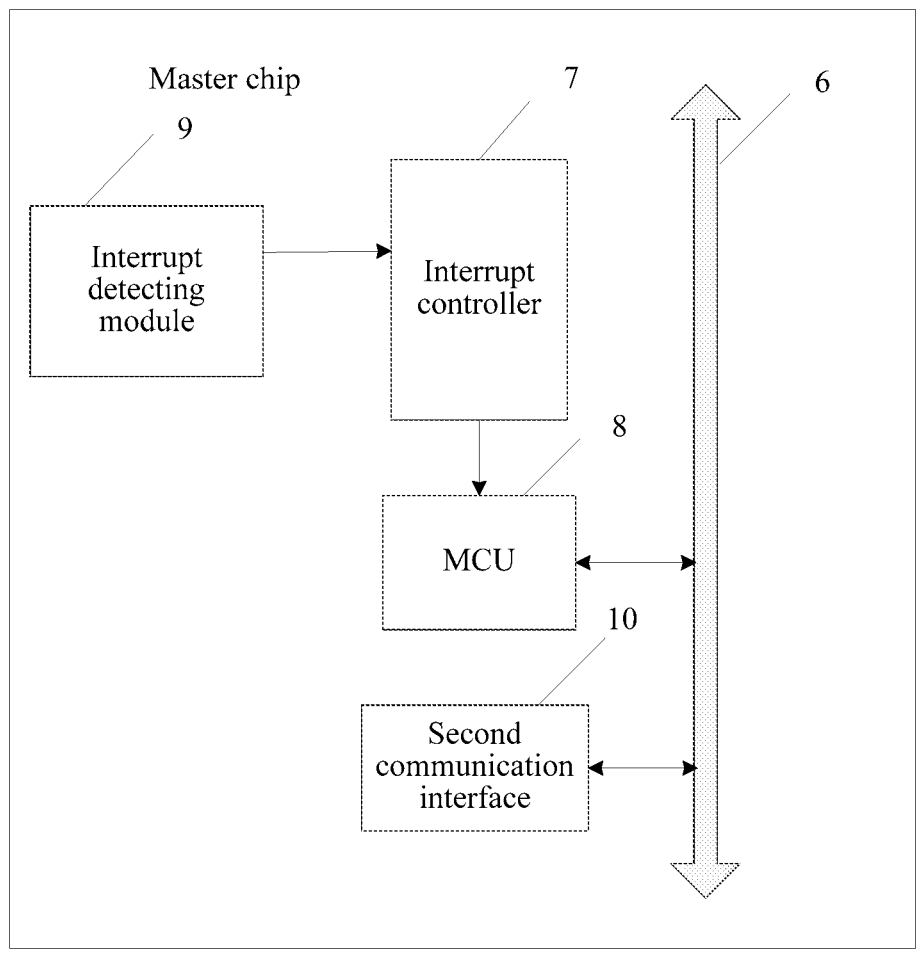
FIG. 8 is a schematic structural diagram of a master chip according to a seventh embodiment of the present disclosure.

A seventh embodiment of the present disclosure relates to a master chip. As shown in FIG. 8, the master chip includes a second bus 6, an interrupt controller 7, a MCU 8, an interrupt detecting module 9, and a second communication interface 10. The second bus 6 is separately connected to the MCU 8 and the second communication interface 10. The interrupt controller 7 is separately connected to the interrupt detecting module 9 and the MCU 8. A quantity of the second communication interfaces 10 may be the same as a quantity of slave chips, and each second communication interface may be connected to one slave chip.

The interrupt detecting module 9 is configured to detect whether there is an interrupt transport request sent by a slave chip on an interrupt line, and send the interrupt transport request to the interrupt controller 7 when the interrupt transport request sent by the slave chip through the interrupt line is detected. The interrupt controller 7 is configured to send an interrupt request acquisition notification to the MCU 8 when receiving the interrupt transport request. The MCU 8 is configured to obtain all the current interrupt requests of the slave chip when receiving the interrupt request acquisition notification. In particular, the MCU may send an access request to the first communication interface 3 of the slave chip through the second bus 6 and the corresponding second communication interface 10, so as to access the slave chip through the first communication interface 3, and obtain all the current interrupt requests of the slave chip through the first communication interface 3 and the first bus 1 of the slave chip.

The MCU 8 further obtains an interrupt subroutine corresponding to each interrupt request after obtaining all the current interrupt requests of the slave chip, and processes a corresponding interrupt request through the obtained interrupt subroutine.

Because the first embodiment and this embodiment correspond to each other, this embodiment may be implemented in cooperation with the first embodiment. Related technical details mentioned in the first embodiment are still valid in this embodiment, and technical effects that can be achieved in the first embodiment may also be implemented in this embodiment. In order to reduce repetition, details are not described herein again. Correspondingly, related technical details mentioned in this embodiment may also be applied to the first embodiment.

In comparison to the existing technologies, in this embodiment, when an interrupt request of a slave chip is detected, the master chip directly obtains all the current interrupt requests of the slave chip through accessing the slave chip, that is, all the interrupt requests of the slave chip are mapped to the master chip. Like an interrupt request generated by a peripheral of the master chip, each interrupt request mapped to the master chip has a corresponding interrupt subroutine on the master chip, and the master chip may process each interrupt request mapped to the master chip by using the corresponding interrupt subroutine. From the perspective of a system and a user, there is no difference between the interrupt request mapped to the master chip and the interrupt request generated by the peripheral of the master chip, and the interrupt processing flow of the two interrupt requests is also consistent, thereby facilitating the user's use. In addition, according to the embodiments of the present disclosure, the interrupt requests generated by all peripherals on the slave chip are prevented from being processed by using one interrupt subroutine, and the interrupt processing flow of the peripheral on the slave chip is also simplified.

An eighth embodiment of the present disclosure relates to a master chip. This embodiment is refined based on the seventh embodiment, and the main refinement is that: this embodiment provides a specific method for obtaining all current interrupt requests of a slave chip.

Figure 9:
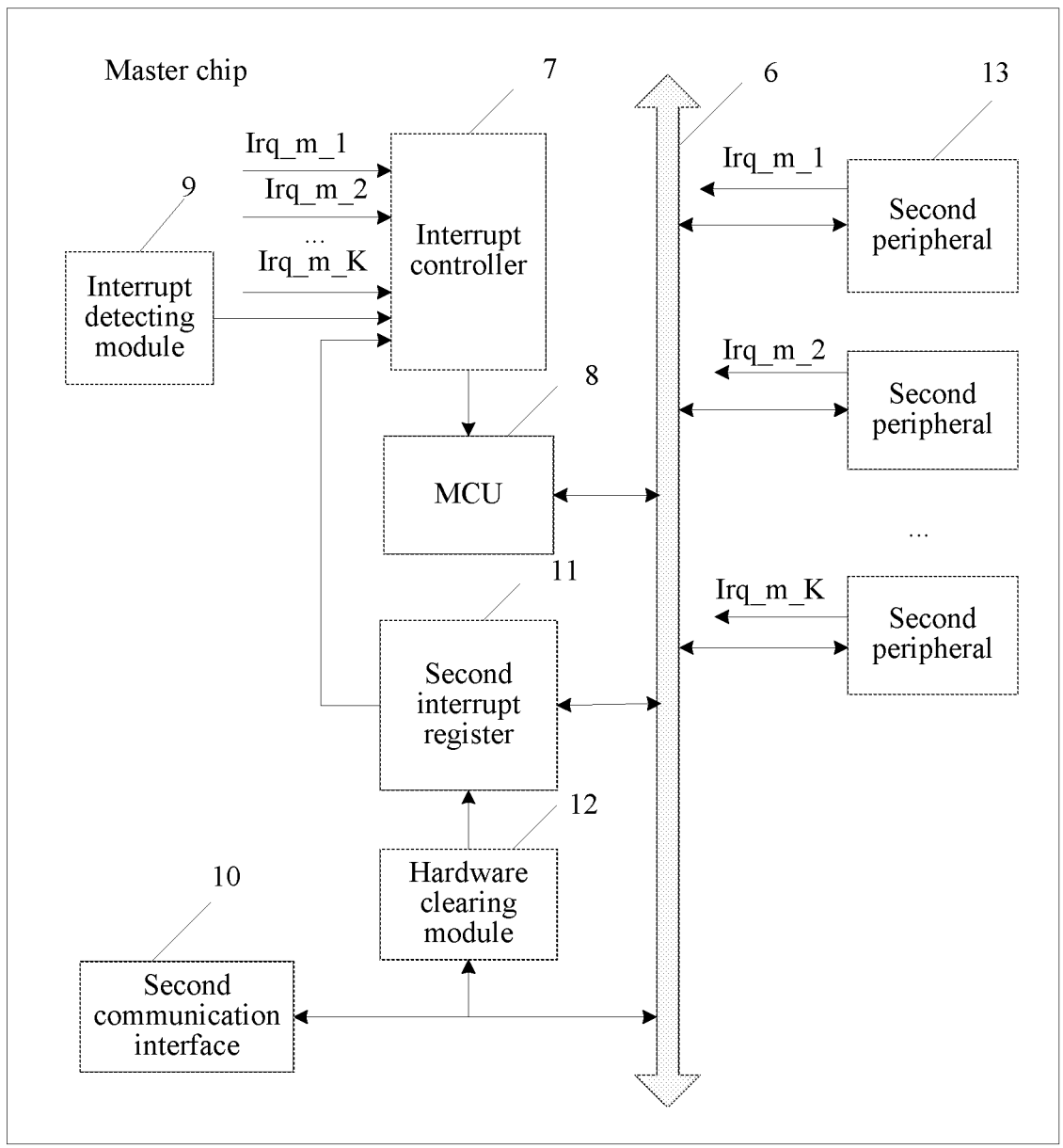
FIG. 9 is a schematic structural diagram of a master chip according to an eighth embodiment of the present disclosure.

As shown in FIG. 9, the master chip further includes a second interrupt register 11, a hardware clearing module 12, and at least one second peripheral 13 that may generate an interrupt request. The second interrupt register 11, the hardware clearing module 12, and the second peripheral 13 are connected to a second bus 6, the second interrupt register 11 is further separately connected to an interrupt controller 7 and a hardware clearing module 12, and the second peripheral 13 is connected to the interrupt controller 7.

In this embodiment, a MCU 8 obtains all the current interrupt requests of the slave chip through reading a current value of a first interrupt register 5 of the slave chip and writing the current value into the second interrupt register 11 of the master chip. In particular, the MCU 8 may send an access request to a first communication interface 3 of the slave chip through the second bus 6 and the second communication interface 10 corresponding to the slave chip, so as to access the slave chip through the first communication interface 3, and then may access the first interrupt register 5 of the slave chip through the first communication interface 3 and the first bus 1 of the slave chip. The MCU 8 may read the current value of the first interrupt register 5 and write the read value into the second interrupt register 11 of the master chip. It is worth mentioning that the MCU 8 may read all the current interrupt requests of the slave chip through a transport subroutine corresponding to the slave chip, to obtain all the current interrupt requests of the slave chip. The interrupt request of the slave chip is obtained by using the transport subroutine, pressure of a main program may be shared, and it is beneficial to rapidly respond to the interrupt request of the slave chip.

After the MCU 8 stores all the current interrupt requests of the slave chip into the second interrupt register 11, the interrupt controller 7 may obtain all the current interrupt requests from the second interrupt register 11, and perform sorting in order of priority on the interrupt requests of the slave chip, the interrupt request generated by a second peripheral 13 on the master chip, and a previously detected interrupt transport request, and notify the MCU 8 of a sorting result upon completion of sorting.

The MCU 8 may process the interrupt requests of the slave chip, the interrupt request that is generated by the second peripheral and that is on the master chip, and the interrupt transport request through a corresponding interrupt subroutine in descending order of the priority. It is worth mentioning that the priority level of the interrupt transport request in this embodiment shall be lower than that of the interrupt requests of the slave chip.

After processing all the current interrupt requests of a slave chip, the MCU 8 may access the slave chip again and clear an interrupt flag that is of a first peripheral and that corresponds to a processed interrupt request. However, this is not limited thereto. The MCU 8 may alternatively clear the interrupt flag that is of the first peripheral and that corresponds to the processed interrupt request after any interrupt request of the slave chip is processed.

In addition, it should be noted that a first interrupt register in the slave chip is preferably a readable register in this embodiment. When the interrupt flag of the first peripheral is cleared, a corresponding interrupt request stored in the readable register is automatically cleared, and a value of the first interrupt register is also synchronously adjusted.

The hardware clearing module 12 is configured to clear the interrupt request corresponding to the interrupt flag in the second interrupt register 11 when it is detected that the MCU clears the interrupt flag of the first peripheral.

In addition, the MCU 8 is further configured to eliminate the interrupt transport request after interrupt flags that are of the first peripheral and that correspond to all the current interrupt requests of the slave chip are cleared. In actual application, the MCU 8 may alternatively eliminate the interrupt transport request after the hardware clearing module 12 clears the interrupt request corresponding to the interrupt flag in the second interrupt register 11.

Because the second embodiment and this embodiment correspond to each other, this embodiment may be implemented in cooperation with the second embodiment. Related technical details mentioned in the second embodiment are still valid in this embodiment, and technical effects that can be achieved in the second embodiment may also be achieved in this embodiment. In order to reduce repetition, details are not described herein again.

Correspondingly, related technical details mentioned in this embodiment may also be applied to the second embodiment.

The eighth embodiment provides a specific method for simultaneously obtaining all current interrupt requests of a slave chip. That is, all the current interrupt requests of the slave chip are aggregated in a readable register (a first interrupt register), and a master chip may simultaneously read all the current interrupt requests of the slave chip from the readable register.

Figure 10:
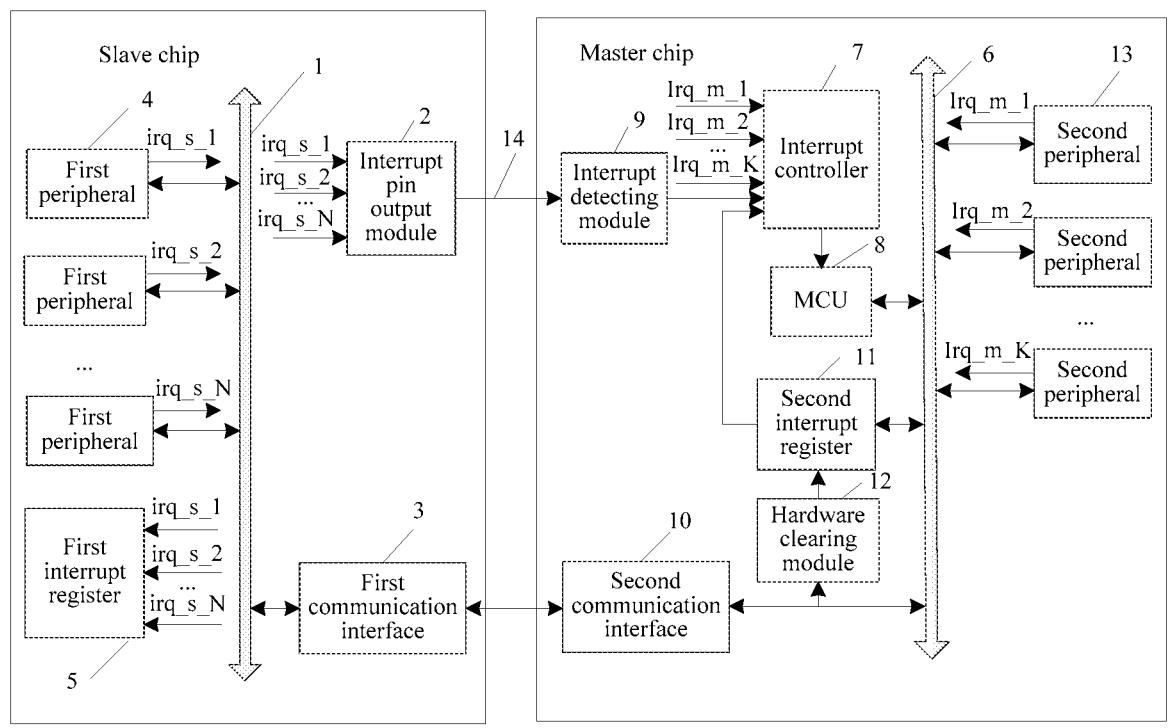
FIG. 10 is a schematic structural diagram of a multi-chip system according to a ninth embodiment of the present disclosure.

A ninth embodiment of the present disclosure relates to a multi-chip system. As shown in FIG. 10, the system includes the master chip as described in the seventh embodiment or the eighth embodiment and at least one slave chip as described in the fifth embodiment or the sixth embodiment. FIG. 10 is a schematic diagram using the master chip in the eighth embodiment and the slave chip in the sixth embodiment. One interrupt line 14 is connected between each slave chip and the master chip. In addition, a first communication interface 3 in the slave chip is connected to a second communication chip 10 on the master chip. It is worth mentioning that a quantity of second communication interfaces 10 on the master chip may be the same as a quantity of the slave chip. In this way, each second communication interface may be correspondingly connected to one first communication interface 3. However, the quantity is not limited thereto. The master chip may alternatively include only one second communication interface 10. In this case, the second communication interface 10 may be disposed to be communicably interacted with one first communication interface 10 at a same moment.

In comparison to the existing technologies, in this embodiment, the master chip directly accesses all the current interrupt requests of the slave chip through accessing the slave chip when an interrupt request of the slave chip is detected, that is, all the interrupt requests of the slave chip are mapped to the master chip. Like an interrupt request generated by a peripheral of the master chip, each interrupt request mapped to the master chip has a corresponding interrupt subroutine on the master chip, and the master chip may process each interrupt request mapped to the master chip by using the corresponding interrupt subroutine. From the perspective of a system and a user, there is no difference between the interrupt request mapped to the master chip and the interrupt request generated by the peripheral of the master chip, and the interrupt processing flow of the two interrupt requests is also consistent, thereby facilitating the user's use. In addition, according to the embodiments of the present disclosure, the interrupt requests generated by all peripherals on the slave chip are prevented from being processed by using one interrupt subroutine, and the interrupt processing flow of the peripheral on the slave chip is also simplified.

A person of ordinary skill in the art may understand that the foregoing embodiments are specific embodiments to implement the present disclosure, and variations can be made in forms and details in actual application without departing from the spirit and scope of the present disclosure.

What is claimed is:

1. An interrupt processing method applied to a master chip, comprising:
   obtaining all current interrupt requests of a slave chip when an interrupt transport request sent by the slave chip through an interrupt line is detected, wherein the interrupt transport request is generated by a first peripheral of the slave chip, wherein the interrupt transport request is a level signal; and
   obtaining an interrupt subroutine corresponding to each interrupt request of all the current interrupt requests, and processing the corresponding interrupt request by using the interrupt subroutine, wherein all current interrupt requests of the slave chip are mapped to the master chip in advance, and each interrupt request mapped to the master chip has a corresponding interrupt subroutine on the master chip.

2. The interrupt processing method according to claim 1, wherein the obtaining all current interrupt requests of a slave chip comprises:
   reading a current value of a first interrupt register of the slave chip, and writing the current value to a second interrupt register of the master chip, to obtain all current interrupt requests of the slave chip, wherein the first interrupt register stores all the current interrupt requests of the slave chip.

3. The interrupt processing method according to claim 1, wherein the obtaining all current interrupt requests of a slave chip comprises:
   obtaining all the current interrupt requests of the slave chip through a transport subroutine corresponding to the slave chip.

4. The interrupt processing method according to claim 2, wherein after the corresponding interrupt request is processed by using the interrupt subroutine, or after any of the interrupt requests is processed, the method further comprises:
   clearing an interrupt flag of the first peripheral corresponding to the processed interrupt request, the current value of the first interrupt register is synchronously adjusted with the clearing of the interrupt flag of the first peripheral.

5. The interrupt processing method according to claim 4, wherein after clearing an interrupt flag of the first peripheral corresponding to the processed interrupt request, the method further comprises:

clearing an interrupt request corresponding to an interrupt flag in the second interrupt register.

6. The interrupt processing method according to claim 4, wherein after clearing interrupt flags of the first peripheral corresponding to all the current interrupt requests of the slave chip, the method further comprises:

clearing the interrupt transport request.

7. The interrupt processing method according to claim 5, wherein after clearing an interrupt request corresponding to the interrupt flag in the second interrupt register, the method further comprises:

clearing the interrupt transport request.

8. The interrupt processing method according to claim 1, wherein the processing the corresponding interrupt request by using the interrupt subroutine comprises:

performing sorting in order of priority on the interrupt transport request of the slave chip, an interrupt request generated by a second peripheral of the master chip, and the interrupt transport request; and processing, by using the corresponding interrupt subroutine in descending order of priority, the interrupt request of the slave chip, the interrupt request generated by the second peripheral of the master chip, and the interrupt transport request, wherein a priority level of the interrupt transport request is lower than that of the interrupt request of the slave chip.

9. A master chip, comprising an interrupt controller, a Micro Controller Unit (MCU), and an interrupt detection module, wherein the interrupt controller is respectively connected to the MCU and the interrupt detection module and wherein:

the interrupt detection module is configured to send, when detecting that there is an interrupt transport request sent by a slave chip on an interrupt line, the interrupt transport request to the interrupt controller, wherein the interrupt transport request is a level signal;

the interrupt controller is configured to send an interrupt request acquisition notification to the MCU when receiving the interrupt transport request; and the MCU is configured to obtain all current interrupt requests of the slave chip when receiving the interrupt request acquisition notification, obtain an interrupt subroutine corresponding to each interrupt request of all the current interrupt requests, and process the corresponding interrupt request by using the interrupt subroutine, and the interrupt transport request is generated by a first peripheral of the slave chip, wherein all current interrupt requests of the slave chip are mapped to the master chip in advance, and each interrupt request mapped to the master chip has a corresponding interrupt subroutine on the master chip.

10. The master chip according to claim 9, wherein the master chip further comprises a second interrupt register;

the MCU is connected to the second interrupt register; and the MCU is configured to read a current value of a first interrupt register of the slave chip, and write the current value to the second interrupt register of the master chip, to obtain all the current interrupt requests of the slave chip wherein the first interrupt register stores all the current interrupt requests of the slave chip.

11. The master chip according to claim 9, wherein the MCU is configured to obtain all the current interrupt requests of the slave chip by using a transport subroutine corresponding to the slave chip.

12. The master chip according to claim 10, wherein the MCU is further configured to clear an interrupt flag that is of the first peripheral and that corresponds to the processed interrupt request, and the current value of the first interrupt register is synchronously adjusted with the clearing of the interrupt flag of the first peripheral.

13. The master chip according to claim 12, wherein the master chip further comprises a hardware clearing module, and the hardware clearing module is connected to the second interrupt register; and the hardware clearing module is configured to clear, when detecting that the MCU clears an interrupt flag that is of the first peripheral and that corresponds to the processed interrupt request, the interrupt transport request corresponding to an interrupt flag in the second interrupt register.

14. The master chip according to claim 13, wherein the MCU is further configured to eliminate the interrupt transport request after clearing interrupt flags that are of the first peripheral and that correspond to all the current interrupt requests of the slave chip.

15. The master chip according to claim 13, wherein the MCU is further configured to eliminate the interrupt transport request after the hardware clearing module clears the interrupt transport request corresponding to the interrupt flag in the second interrupt register.

16. The master chip according to claim 9, wherein the master chip further comprises at least one second peripheral for generating an interrupt request; the second peripheral is connected to the interrupt controller;

the interrupt controller is further configured to receive an interrupt request sent by the second peripheral, and perform sorting in order of priority on the interrupt request sent by the second peripheral, the interrupt transport request, and the interrupt request of the slave chip generated by the first peripheral; and the MCU is specifically configured to process, by using the corresponding interrupt subroutine in descending order of the priority, the interrupt request of the slave chip, the interrupt request generated by the second peripheral of the master chip, and the interrupt transport request, wherein a priority level of the interrupt transport request is lower than that of the interrupt request of the slave chip.

17. A multi-chip system, comprising:

at least one slave chip, each comprising a first communication interface; and a master chip, comprising a second communication interface connected to the first communication interface through an interrupt line, and the master chip comprises an interrupt controller, a MCU, and an interrupt detection module, wherein:

the interrupt controller is respectively connected to the MCU and the interrupt detection module;

the interrupt detection module is configured to send, when detecting that there is an interrupt transport request sent by the slave chip on the interrupt line, the interrupt transport request to the interrupt controller, wherein the interrupt transport request is a level signal;

the interrupt controller is configured to send an interrupt request acquisition notification to the MCU when receiving the interrupt transport request; and the MCU is configured to obtain all current interrupt requests of the slave chip when receiving the interrupt request acquisition notification, obtain an interrupt subroutine corresponding to each interrupt request of all the current interrupt requests, and process the corresponding interrupt request by using the interrupt subroutine, and the interrupt transport request is generated by a first peripheral of the slave chip, wherein all current interrupt requests of the slave chip are mapped to the master chip in advance, and each interrupt request mapped to the master chip has a corresponding interrupt subroutine on the master chip.

18. The multi-chip system according to claim 17, wherein the master chip further comprises a second interrupt register;
the MCU is connected to the second interrupt register; and
the MCU is configured to read a current value of a first interrupt register of the slave chip, and write the current value to the second interrupt register of the master chip, to obtain all the current interrupt requests of the slave chip wherein the first interrupt register stores all the current interrupt requests of the slave chip.

19. The multi-chip system according to claim 18, wherein the MCU is configured to obtain all the current interrupt requests of the slave chip by using a transport subroutine corresponding to the slave chip.

20. The multi-chip system according to claim 18, wherein the MCU is further configured to clear an interrupt flag that is of the first peripheral and that corresponds to the processed interrupt request, and the current value of the first interrupt register is synchronously adjusted with the clearing of the interrupt flag of the first peripheral.

\* \* \* \* \*